T. G. KELLY.
HAUL-BACK CARRIAGE FOR RECIPROCATING SCRAPERS.
APPLICATION FILED DEC. 26, 1911.
1,031,342.  Patented July 2, 1912.
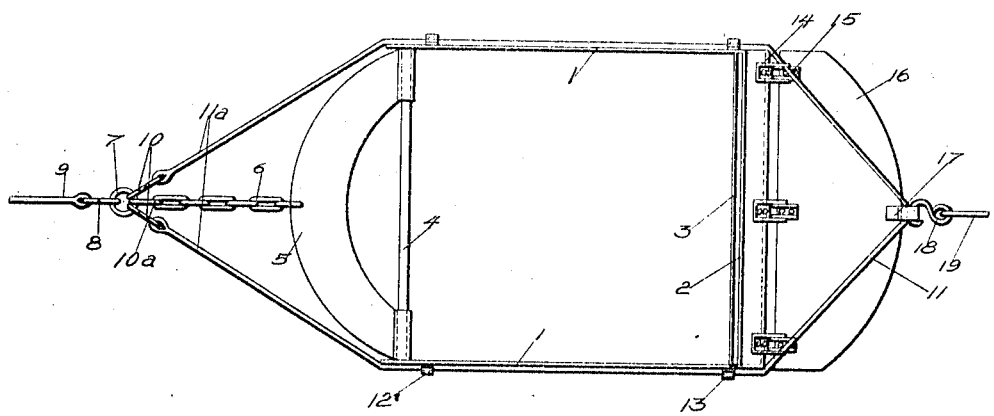
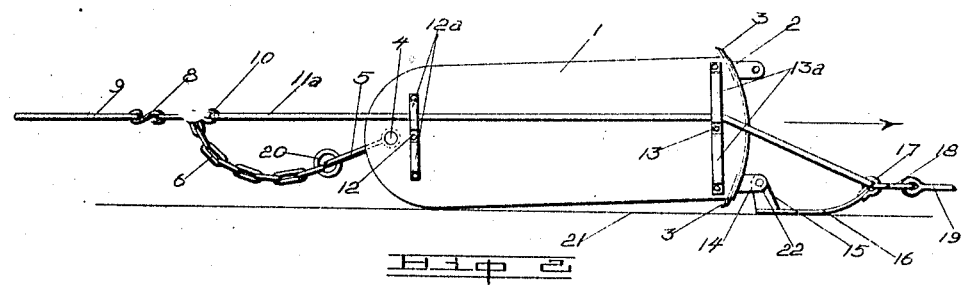
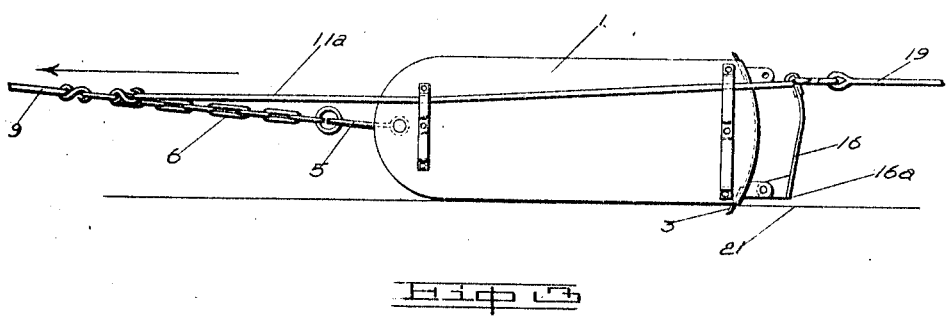
WITNESSES
INVENTOR
Thomas Gitchel Kelly,
BY
ATTORNEY

UNITED STATES PATENT OFFICE.

THOMAS GETCHEL KELLY, OF CLIFTON, OREGON.

HAUL-BACK CARRIAGE FOR RECIPROCATING SCRAPERS.

1,031,342. Specification of Letters Patent. Patented July 2, 1912.

Application filed December 26, 1911. Serial No. 667,946.

*To all whom it may concern:*

Be it known that I, THOMAS GETCHEL KELLY, a citizen of the United States, residing at Clifton, in the county of Clatsop and State of Oregon, have invented certain new and useful Improvements in Haul-Back Carriages for Reciprocating Scrapers, of which the following is a specification.

The present invention relates to haul back carriages for reciprocating scrapers, and has for its object, to provide a carriage for the return movement of the scraper after the load has been discharged.

A further object is to provide a means for returning the scraper clear of the earth so that it may be returned by a low power, and thereby allow the engine to accumulate steam for the loading movement.

These and other objects, are accomplished by the mechanism illustrated in the accompanying drawing in which—

Figure 1 is a plan view of the device. Fig. 2 is a side elevation showing the scraper raised by the carrier in the return movement. Fig. 3 is a similar view, showing the carriage raised and the scraper in operation on a forward movement.

Referring to the drawing in detail, 1 represents the side members of a scraper, of the form which is operated by reciprocatory movements, the scraper being loaded and drawn to its destination by an advance movement, and then retracted along substantially the same line for re-loading.

2 is the rear end member formed on the arc of a circle, to the upper and lower edges of which are secured cutting members 3, which are sharpened and extended a suitable distance beyond the respective edges of the side members, thereby forming cutting edges for engaging in the earth. It will be observed that the scraper is reversible, so that it may be operated with either side upward. Between the front ends of the side members, is fixed a transverse bar or stay 4, to which is hingedly secured the pull bail 5. To this bail is attached the connecting chain 6, through which power is applied to the scraper by means of the main line, 9, which is connected thereto, by means of ring 7, and hooks 8 and 10$^a$. To the rear end member, at a suitable distance from each edge thereof, is fixed in transverse alinement, a set of hinge brackets 14. To each set of brackets, upon pins 22, is connected the carriage 16 by means of a corresponding set of brackets, 15. These hinge brackets are made of strong material, and the members, 15 are of such length that when the carriage is extended to lie upon the ground, indicated by the line 21, the cutter 3, of the scraper, will be raised clear of the ground; and by the application of power upon the haul back line, 19, which is connected to the carriage by means of hook 18 engaged in the eye 17, the scraper is raised from the ground and retracted as desired. A crotch line or cable 11$^a$, is passed through the eye 17, and extended laterally along each side of the scraper through its respective keepers, 13$^a$ at the rear; thence through keepers 12$^a$ at the front, after which, each end portion is inclined toward the center, and united by means of hooks 10 with the ring 7, and thereby connected with the main line 9.

In the retraction of the device by the haul back line 19, the scraper is drawn clear of the ground at the rear end by the carriage, and the main line is retracted by the crotch line, 11, which passes freely within the keepers, 12$^a$ and 13$^a$. In the forward pull, the first strain on the main line, comes upon the crotch line, which advances through its keepers and swings the carriage upon its hinges to the vertical position shown in Fig. 3. At this point, the line 9 will have advanced sufficiently to draw the chain 6, taut, when the power will be applied to the scraper, causing it to be loaded and drawn to its forward destination. When its load shall have been discharged, the haul back line will again retract the main line, extending the carriage and raising the scraper as seen in Fig. 2, when the entire device will be retracted thereby.

The keepers, 12$^a$ and 13$^a$, are provided with a retainer 12 and 13, respectively at their intermediate portions, so that either end thereof, may be employed to retain the crotch line, according to the side of the scraper, which is uppermost. These retainers support the crotch line above the pivotal point of the carriage.

It will be seen that the carriage which presents to the ground a broad surface, gradually inclined upwardly at its free edge, will not sink into the earth in any ordinary condition thereof, and will not settle into small cavities nor permit the scraper to engage the usual obstructions; and it therefore prevents it from being easily overturned. Without the use of the carriage, the scraper dragging on the ground, would gather the earth and obstructions, and would consume almost as much power as in the loading operation.

The power necessary to return the scraper, by the aid of this improvement, is much less than in ordinary usage; the engine can therefore replenish its steam during such return movement, and will not become exhausted by unprofitable work.

Various modifications of the device may be employed for performing the functions herein described, but all of which is within the spirit and scope of my invention; and

What I claim as new, is:

1. The combination with a scraper, of hinges secured upon the rear end-piece near the lower edge thereof, keepers, fixed near the upper edge about the scraper, a drag apron having a width approximately equal to that of the scraper, the free edge of which converges toward its center and is curved upwardly, hinge brackets having a length greater than the height of those upon the scraper for connecting the drag to the scraper, a crotch line passing through a loop in the free edge of the drag, thence through the keepers at the upper edge of the scraper, an inhaul cable connected to the front portion of the crotch line and to the scraper, and an outhaul cable operating on the free edge of the drag.

2. The combination with a scraper, of hinges secured upon the rear end-piece near the lower edge thereof, keepers fixed near the upper edge about the scraper, a drag apron pivotally connected to said hinges, the free edge of which converges toward its center and is curved upwardly, a crotch line passing through a loop in the free edge of the drag, thence through the keepers at the upper edge of the scraper, and an outhaul cable secured to the free edge of the drag.

In testimony whereof I affix my signature in presence of two witnesses.

THOMAS GETCHEL KELLY.

Witnesses:
W. G. KING,
A. J. MATTER.